(12) United States Patent
Peters

(10) Patent No.: US 8,155,844 B2
(45) Date of Patent: Apr. 10, 2012

(54) IMPLEMENT LIFT APPARATUS CONTROL SYSTEM POSITION SENSING

(75) Inventor: Ole Peters, Neuenkoogsdeich (DE)

(73) Assignee: Deere & Company, Moline, IL (US)

( * ) Notice: Subject to any disclaimer, the term of this patent is extended or adjusted under 35 U.S.C. 154(b) by 644 days.

(21) Appl. No.: 12/191,413

(22) Filed: Aug. 14, 2008

(65) Prior Publication Data

US 2009/0082930 A1     Mar. 26, 2009

(30) Foreign Application Priority Data

Sep. 26, 2007   (DE) .................. 10 2007 045 846

(51) Int. Cl.
*G06G 7/78*   (2006.01)
*G06G 7/66*   (2006.01)

(52) U.S. Cl. .......................... 701/50; 701/36
(58) Field of Classification Search .................. 701/50, 701/36; 172/1–12

See application file for complete search history.

(56) References Cited

U.S. PATENT DOCUMENTS

| | | | | |
|---|---|---|---|---|
| 3,497,014 A * | 2/1970 | Ask | ................................ | 172/4.5 |
| 4,515,221 A * | 5/1985 | van der Lely | ..................... | 172/3 |
| 4,878,543 A | 11/1989 | Kauss | | |
| 2007/0299589 A1* | 12/2007 | Gianoglio et al. | ............. | 701/50 |
| 2008/0134547 A1* | 6/2008 | Kliffken et al. | ................. | 37/347 |
| 2008/0234902 A1* | 9/2008 | Johnson et al. | ................. | 701/50 |

FOREIGN PATENT DOCUMENTS

| | | |
|---|---|---|
| DE | 43 28 144 | 2/1995 |
| DE | 199 01 563 | 7/2000 |
| WO | 2007/112718 | 10/2007 |

* cited by examiner

*Primary Examiner* — Bret Hayes

(57) ABSTRACT

An agricultural machine includes a lifting apparatus to which an implement or tool is attached. A control system controls the lifting apparatus in response to sensed parameters and operator inputs. The control system includes a first acceleration sensor positioned on the lifting apparatus and/or on the implement, and at least one reference acceleration sensor positioned on the vehicle. The control system includes an electronic control unit which processes acceleration signals from the acceleration sensors and generates a lift apparatus or implement position signal as a function thereof.

13 Claims, 7 Drawing Sheets

IMPLEMENT LIFT APPARATUS CONTROL SYSTEM POSITION SENSING

FIELD OF THE INVENTION

The present invention relates to an implement coupling control system which utilizes acceleration sensors for position sensing.

BACKGROUND OF THE INVENTION

Many types of vehicles have control systems which control a hitch or lifting apparatus to which an implement or tool is attached. With such a control system it is known to sense or determine the position of the lifting apparatus which is coupled to the vehicle, or to determine the position of implements or tools which are coupled to the lifting apparatus. Such a lifting apparatus normally includes an actuator or motor, such as hydraulic cylinders which extend between a movable linkage and an attachment frame of the vehicle. For example, front loaders have movable linkages which are a pair of rockers which are pivotably coupled to a bracket which is connected to the frame of an agricultural tractor. The movable linkage of a front loader can be coupled at its free end to the tool, for example to a shovel or to a fork. It is also known to provide front loaders of this type with sensors to determine the position of the lifting apparatus or of a tool or implement. Various control algorithms for automating the operation of the front loader, for example, for parallel guidance of the implement or in order to repeatedly or reproducibly move into an adjustable reference position, can be derived from the determined positions of the lifting apparatus or of the implements. See in this respect "Optimization possibilities for front loader work", 58 Landtechnik January 2003, pages 26/27, "Integratable position and speed sensors for mobile hydraulics", 59 Landtechnik April 2004, pages 206/207; "Strategies for the automated operation of front loaders", 59 Landtechnik June 2004, page 322 et seqq., and "Operation and control strategies for automated front loader work", 60 Landtechnik April 2005, page 230 et seqq.). The systems described in these articles are limited to the use of travel sensors, speed sensors, inclination sensors, contact sensors or to potentiometers, magneto-resistive length sensors in hydraulic cylinders, open-loop control approaches (characteristic diagram measurement of valves with referencing) as well as I/O control systems with final position switches or Hall sensors. The disadvantages of such known approaches are that, owing to their arrangement on the vehicle, the aforesaid sensors or sensor systems are frequently subjected to damage, are excessively costly or are not yet mature technology, in particular with respect to the accuracy and sensitivity of some sensors or sensor systems. For example, moving parts in the sensors or in the sensor system and the sensors or the sensor system itself often have to be protected, only achievable with large expenditure, owing to their unfavourable arrangement on the vehicle or on the lifting apparatus.

DE 199 00 587 A1 discloses an apparatus for measuring the position and angle of articulator elements of a movement system, wherein the apparatus includes acceleration sensors whose signals are employed, in an iteration method, to calculate loads and displacements of the centre of gravity on the articulator elements or on the entire movement system, in which case, after iteration has taken place, the angles and positions of the individual elements of the movement system can be calculated with respect to the vertical. The apparatus is suitable, in particular, for construction machines and forestry machines, a more detailed application of the system in such machines not being described. It is disadvantageous that the disclosed system is based on the implementation of iteration steps and therefore requires a large amount of complex computing work and in addition is inaccurate and only refers to parameter data relating to the vertical.

SUMMARY OF THE INVENTION

Accordingly, an object of this invention is to provide an control system which overcomes the abovementioned problems.

According to the invention, an agricultural machine is provided with sensors which comprise acceleration sensors. At least a first acceleration sensor is positioned on the lifting apparatus and/or on the implement, and at least one reference acceleration sensor is positioned on the vehicle. A position signal for the lifting apparatus and/or for the implement can be generated by the electronic control unit by means of a relative measurement of the signals of the acceleration sensors. The reference sensor can be positioned at any desired position on the vehicle outside the lifting apparatus or the implement, for example anywhere on the rear part of the vehicle, on the bodywork or on the vehicle frame as well as on the drive train or on the drive axles etc. With the reference acceleration sensor on the vehicle and at least one acceleration sensor on the lifting apparatus or on the implement, a relative angle measurement can be implemented in a selectable reference plane of the vehicle (x-z or y-z plane).

The acceleration sensors preferably have two measurement axes and determine or indicate the direction of the acceleration vector acting on them. It is also conceivable to use acceleration sensors with three measurement axes or to use a plurality of acceleration sensors with just one measurement axis. Generally, on the one hand, the acceleration due to gravity and, on the other hand, the acceleration of the vehicle are taken into account. The position of the lifting apparatus or of the implement can be determined from the difference in direction of the vector of the at least one acceleration sensor on the lifting apparatus or on the implement from the vector of the reference sensor on the vehicle. In this context, it is also possible to provide a plurality of reference sensors on the vehicle in order to optimize the determination of positions, with the result that, for example, unevenness in the ground or inclined positions of the vehicle can be compensated. In an agricultural machine it is advantageous that it is not necessary to provide any moving parts in the sensor system and the acceleration sensors can be positioned at protected locations. In addition, cost-effective acceleration sensors can be used which are already known from robotics and automation and have been proven. In addition, they have a high degree of sensitivity and accuracy. Furthermore, the arrangement of the acceleration sensors permits general automation strategies for the vehicle, for example electronic tracking of the lifting apparatus or of the implement, control of the position of the lifting apparatus or implement or also programming of positions which can be moved to in an automated fashion. It is therefore possible, for example in the case of an agricultural tractor which is equipped with a front loader, to track a shovel which is coupled to the front loader, so that the shovel is always guided horizontally with respect to the surface of the ground, as a result of which fluctuations in the position of the shovel when there are unevenness in the ground or in the case of spring movements of the vehicle can be compensated.

The acceleration sensors are preferably micro-electro-mechanical acceleration pickups or micro-mechanical acceleration meters. However, it is also conceivable to use different types of acceleration sensors, for example piezoelectric or magneto-inductive acceleration sensors.

In addition, an additional reference sensor in the form of a gyroscope or rotational speed sensor may be positioned on the vehicle in order to improve the reference measurement and/or in order to perform error correction. It is therefore possible to compensate more accurately errors which creep in owing, for example, to the different positioning of acceleration meters and reference sensors. A three-axle gyroscope with integrated acceleration pickup can measure, for example, all 6 degrees of freedom of a vehicle as a reference. This has the advantage that the acceleration sensors which are positioned on the implements permit a detection of a position at which all the translatory and rotational errors can be compensated.

In a preferred embodiment, at least a second acceleration sensor is positioned on the lifting apparatus and/or on the implement, with the result that at least two or more acceleration sensors are provided and they are placed or connected on the vehicle in reference to the reference sensor. In this way it is possible for the position of both the lifting apparatus and of the implement as well as of further components on the vehicle which are provided with acceleration sensors to be determined by sensor independently of one another and moved to.

The lifting apparatus may be a front loader and the implement may be a front loader tool, for example as a shovel, gripper or fork. It is therefore possible to determine the positions of the front loader and of the front loader tool independently of one another by means of the acceleration sensors which are positioned on the front loader and on the front loader tool and to move to them or manipulate them in a targeted fashion by means of a corresponding embodiment of the electronic control unit and by implementing corresponding control algorithms. It is therefore possible, for example, to control the position of the front loader as a function of predefinable operator control steps, with the result that, for example when lifting the extension arm, said arm is moved automatically into a predefinable first position, and when it is lowered it is moved automatically into a predefinable second position.

The front loader preferably comprises a tool receptacle to which the implement or the front loader tool can be coupled, wherein the at least one acceleration sensor or the second acceleration sensor is positioned on the tool receptacle. It is therefore possible, for example, to provide a rocker of the front loader with an acceleration sensor in order to sense or control or move to the position of the lifting mechanism, and to provide a further acceleration sensor on the tool receptacle, with which acceleration sensor the position of the tool is sensed. As a result, the same acceleration sensor, specifically the sensor which is positioned on the tool receptacle, can be used to determine the position of any tool which is coupled to the tool receptacle. It is therefore possible to avoid any tool having to be provided with its own acceleration sensor. In a further preferred refinement of the invention, the lifting apparatus comprises a trailer apparatus, in particular as a three-point trailer apparatus, and the implement comprises a trailer unit which can be coupled to the trailer apparatus. It is therefore possible, for example, to determine and control electronically the position of any desired trailer unit or implement which can be coupled to a three-point trailer device. Said trailer unit or implement may be, for example, a soil working device or a field sprayer trailer.

The lifting apparatus may also be an implement linkage for a combine header, and the implement may be a combine header. For example, a mowing/reaping header, a machine for picking up harvested material, a cutting mechanism, a reel or the like can be coupled to an implement linkage on the vehicle, and in this way it is possible to control the positioning of the implement at a specific predefinable distance from the ground.

The vehicle may be an agricultural tractor, in which case the tractor can have a lifting apparatus on either its front side, for example a front loader, or on its rear side, for example a three-point trailer apparatus.

Alternatively, the vehicle may be a self-propelling harvesting machine, for example as a combined harvester, which is provided with a reel or a combine header on a lifting apparatus or on an implement linkage, or as a self-propelled forage harvester, which is provided with a machine for picking up harvested material (pickup, maize harvesting implement etc.) on a lifting apparatus or on an implement linkage, and the position of the implement linkage or of the reel or of the combine header or of the machine for picking up harvested material can be controlled electronically here.

Alternatively, the vehicle may be a self-propelling agricultural field sprayer, wherein the lifting apparatus comprises a parallelogram linkage, and the implement comprises a sprayer linkage, and the position of the sprayer linkage with respect to the ground can be controlled electronically here.

Alternatively, the vehicle may be a construction machine, in particular as a wheel loader vehicle, wherein the lifting apparatus comprises a loading apparatus, and the implement comprises a shovel. In this case, it is possible to implement, for example, tracking of the shovel, with the result that during excavation and transportation operations it is ensured that the shovel is guided parallel to the surface of the ground irrespective of the structure of the ground and the position of the construction machine, and changes in the position of the construction machine (when there are unevennesses in the ground or in the case of spring movements) can be compensated, with the result that changes in the pivoting angle of the shovel which are caused by this and associated loss of bulk material can be avoided.

Alternatively, the vehicle may be a telescopic loader vehicle, wherein the lifting apparatus comprises a telescopic extension arm to which an implement can be coupled via a tool receptacle. In this context it is possible, for example, to carry out tracking of the implement, with the result that during loading and transportation operations it is ensured that the implement is guided parallel to the surface of the ground irrespective of the structure of the ground and the position of the construction machine, and changes in the position of the construction machine (when there is unevenness in the ground or in the case of spring movements) can be compensated, with the result that changes in the pivoting angle of the implement which are caused by this are avoided. In addition, it also is possible, for example, to control the position of the telescopic extension arm as a function of the length of the telescopic extension arm, or for automated position following to be carried out for the telescopic extension arm as a function of predefined operator control steps so that, for example when lifting the extension arm, it is moved to a predefinable first position, and during lowering it is moved to a predefined second position.

DESCRIPTION OF THE PREFERRED EMBODIMENT

Figure 1:
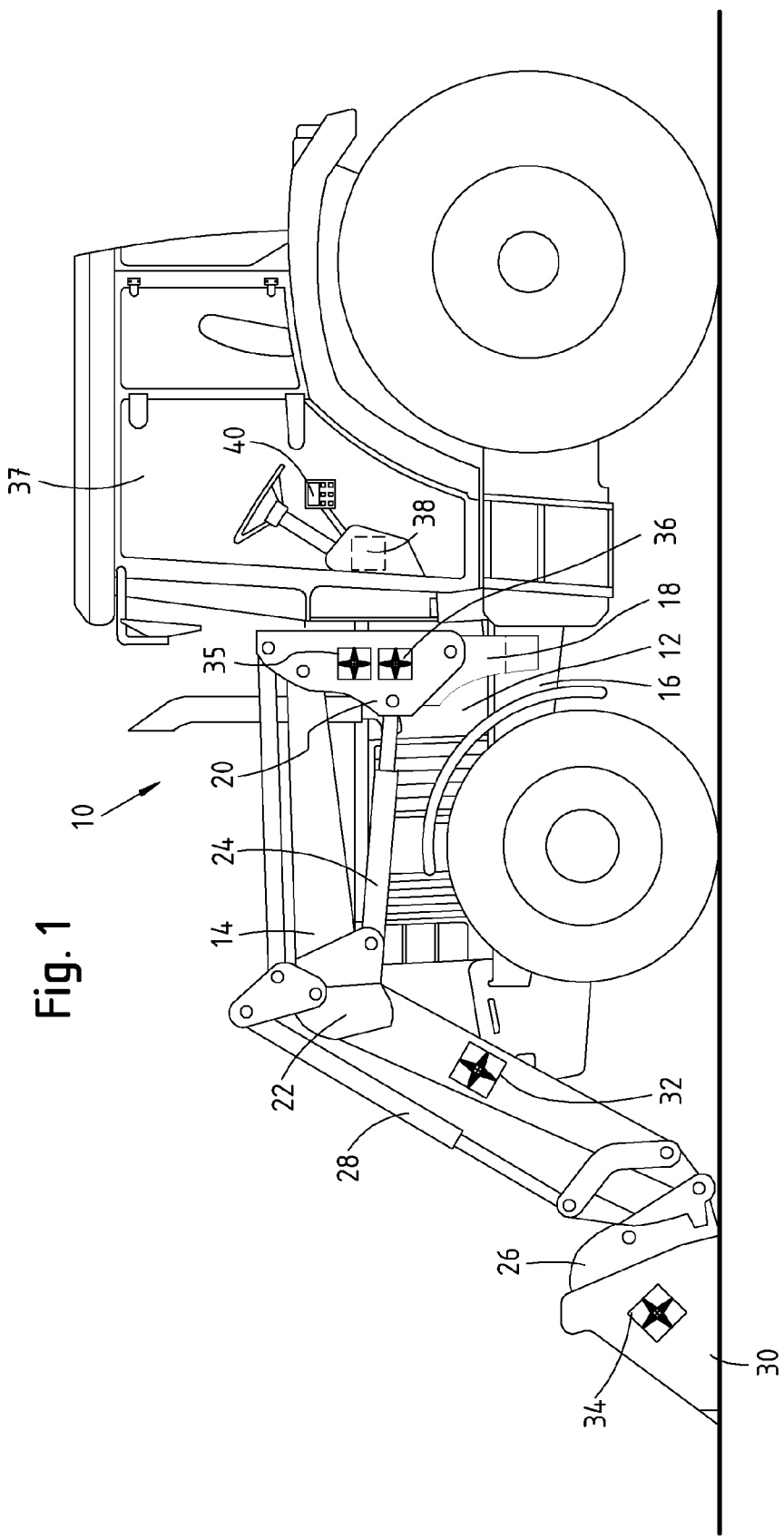
FIG. 1 is a schematic side view of an agricultural tractor with a front loader and a tool and showing sensor locations according to the present invention.
Figure 2:
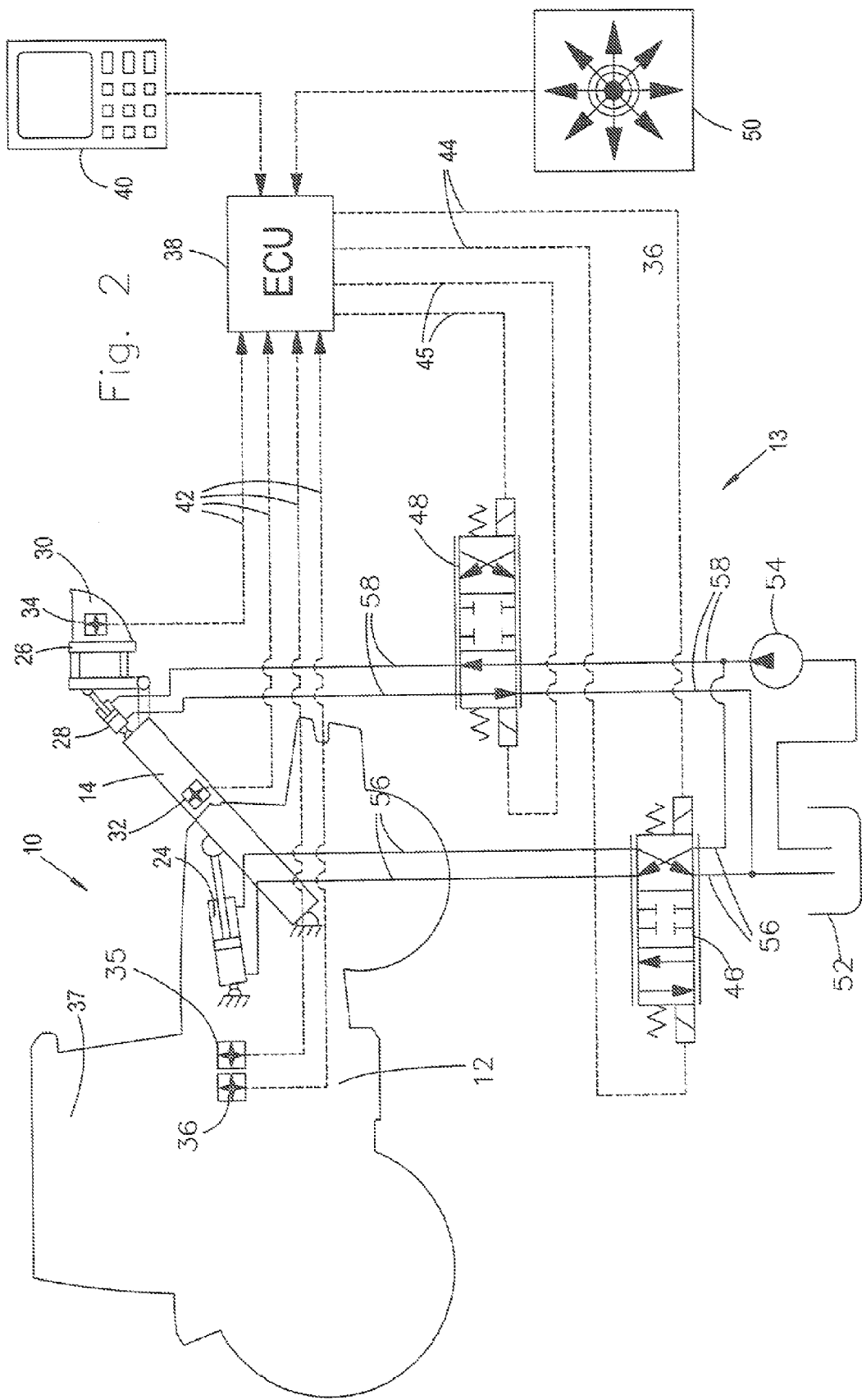
FIG. 2 is a schematic diagram of an implement coupling control system for the tractor of FIG. 1.

FIGS. 1 and 2 show an agricultural machine 10 with a tractor 12 with a lifting apparatus in the form of a front loader 14 and an implement coupling control system 13. The front loader 14 is coupled to the tractor 12 by means of a bracket 18 which is connected to a frame 16 of the tractor and to a connecting pole 20. The front loader 14 has a rocker 22 which is coupled in a pivotable fashion to the connecting pole 20 by means of hydraulic cylinders 24. A tool receptacle 26, which is pivotally coupled to the rocker 22 by means of a further hydraulic cylinder 28, is arranged at the front end of the rocker 22. An implement or tool in the form of a loader shovel 30 is attached to the tool receptacle 26. The front loader 14 is provided in the region of the rocker 22 with a first acceleration sensor 32. A further acceleration sensor 34 is provided in the region of the loader shovel 30. In addition, the tractor 12 is provided with an acceleration sensor which constitutes a reference sensor 35 which is attached in the region of the bracket 18 (or at any other desired location on the tractor 12). The acceleration sensor 34 can also be arranged directly on the tool receptacle 26 here, as a result of which it would be possible to use the same acceleration sensor 34 for determining the position of various tools.

The control system may also include a further reference sensor 36, in the form of a gyroscope or rotational speed sensor. The further reference sensor 36 can be used for improved reference measurement and is positioned on the vehicle or tractor 12. Owing to the different positioning of acceleration meters 32, 34 and reference sensors 35, 36 it is therefore possible, for example, to compensate more accurately errors which creep in. A three-axle gyroscope with integrated acceleration pickup can measure, for example, all six degrees of freedom of a vehicle as a reference. This has the advantage that the acceleration sensors 32, 34 which are positioned on the implements then permit position detection, during which all the translatory and rotational errors can be compensated. Such an additional reference sensor 36 can be used in all the exemplary embodiments described here with reference to FIGS. 1 to 7.

The control system 13 also includes an electronic control unit 38 which is arranged in the region of the cab and is connected to an input module 40. The input module 40 permits an operator to input control data and/or reference data which can be fed to the electronic control unit 38, and as a function of which the control unit 38 carries out programmable control instructions. As illustrated in FIG. 2, the control unit 38 is connected by electronic sensor lines 42 to the acceleration sensors 32, 34, 35 and/or reference sensor 36, and by electronic control lines 44, 45 to hydraulic switching valves 46, 48 which can be actuated to regulate hydraulic flow for operating the hydraulic cylinders 24, 28. The control valves 46, 48 are preferably magneto-inductive proportional valves. The electronic control unit 38 is also connected to an operator control lever 50, for example a joystick, by means of which control signals for actuating the hydraulic switching valves 46, 48 can be triggered by an operator. In order to supply the hydraulic cylinders 24, 28 hydraulically, a hydraulic reservoir 52 and a hydraulic pump 54 are provided and they are respectively connected to the hydraulic cylinders 24, 28 by means of hydraulic connecting lines 56, 58 and by means of the hydraulic switching valves 46, 48.

The determination of the position of the lifting apparatus 14 and of the implement 30 is done by means of the sensors (32, 34, 35, 36, 38) so that a reference acceleration vector generated by the reference sensor 35 is fed to the electronic control unit 38. At the same time, the acceleration sensor 32 on the lifting apparatus (front loader) and the acceleration sensor 34 on the implement (loader shovel) each generate a position acceleration vector, which are also fed to the electronic control unit.

The control unit 38, as a function of the relationship of the vectors which are fed to it, determines a relatively accurate position of the lifting apparatus 14 or of the implement 30 relative to the vehicle. Using the signals of a reference sensor 36, which is provided if appropriate, the accuracy of the determination of positions can be additionally improved. The electronic control unit 38 can be supplied with corresponding target variables or control variables by an operator by means of the input module 40. The electronic control unit 38 controls the actuation of the hydraulic control valves 46, 48 and of the hydraulic cylinders 24, 28 as a function of the sensed positions and the target or control variables. For this purpose, the electronic control unit 38 executes control algorithms which are stored therein. It is therefore possible, for example, to input a maximum height of the implement 30 or likewise a minimum height. As a result, for example, the lifting apparatus 14 is raised to the predefined maximum height automatically (controlled by the electronic control unit 38) during the hydraulic lifting process (by activating the operator control lever 50). Correspondingly, the lifting apparatus 14 is lowered automatically to the minimum height during the hydraulic lowering process. A further example would be to predefine a preferred working position for the implement 30 so that, for example, the shovel 30 of the front loader 14 is always guided parallel to the surface of the ground in the raised position in order, for example when moving bulk materials, to ensure the smallest possible loss of spilt bulk material. Such a loss is caused by changes in position of the implement 30 when the position of the vehicle changes due to braking, accelerating, spring compression and spring extension or when traveling over uneven ground. By means of a corresponding control algorithm which is implemented in the electronic control unit 38, the acceleration vector data which are supplied by the acceleration sensors 32, 34, 35 can be used to counteract such a change in position of the vehicle and to keep the implement 30 in the position selected by the operator using the input module 40. The electronic control unit 38 generates a corresponding control signal which is fed to the assigned hydraulic control valve 48 for correspondingly actuating or activating the hydraulic cylinder 28.

Further exemplary embodiments according to the invention are shown in FIGS. 3 to 7, with the functional relationships which are described above with reference to FIG. 2 being correspondingly applicable to the exemplary embodiments illustrated in FIGS. 3 to 7. A further functional description of the determination of positions for the lifting apparatus and implement is therefore not given. For this reason, the same reference signs have been used in FIGS. 3 to 7 for functional components which have the same meaning.

Figure 3:
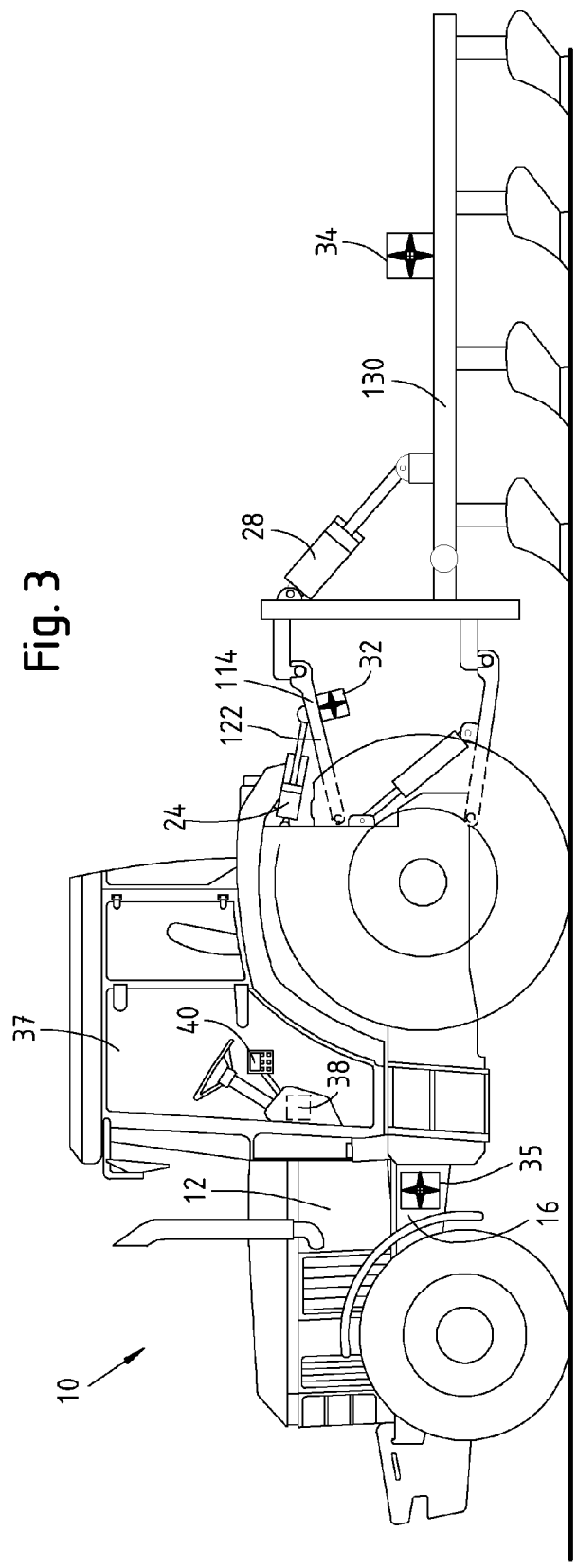
FIG. 3 is a schematic side view of a tractor with three-point trailer apparatus and soil processing device, and showing sensor locations according to the present invention.

For example, FIG. 3 shows a tractor 12 in combination with a lifting apparatus in the form of a three-point trailer apparatus 114. The three-point trailer apparatus 114 is connected via a mounting frame (not shown) at the rear to a frame 16 of the tractor 12. The three-point trailer apparatus 114 has pull rods 122 which are pivotably coupled to the mounting frame by means of hydraulic cylinders 24. An implement in the form of a soil working device 130 which is pivotably coupled by means of a further hydraulic cylinder 28 is arranged at the rear end of the pull rods. The three-point trailer apparatus 114 is provided with a first acceleration sensor 32 in the region of the pull rods 122. A further acceleration sensor 34 is provided in the region of the soil working device 130. In addition, the tractor 12 is provided with an acceleration sensor which constitutes a reference sensor 35 which is attached in the region of the frame 16 (or at any other desired location on the tractor 12). The tractor 12 also comprises an electronic control unit 38 which is arranged in the region of a cab 37 and is connected to an input module 40. The determination of the position of the lifting apparatus 114 or of the implement 130 is carried out as described above with respect to FIG. 2, in which case the components with the reference signs 14 and 30 corresponding to the exemplary embodiment in FIG. 3 are to be replaced by the components with the reference signs 114 and 130. Other components, such as for example the tool receptacle 26, are dispensed with here.

Figure 4:
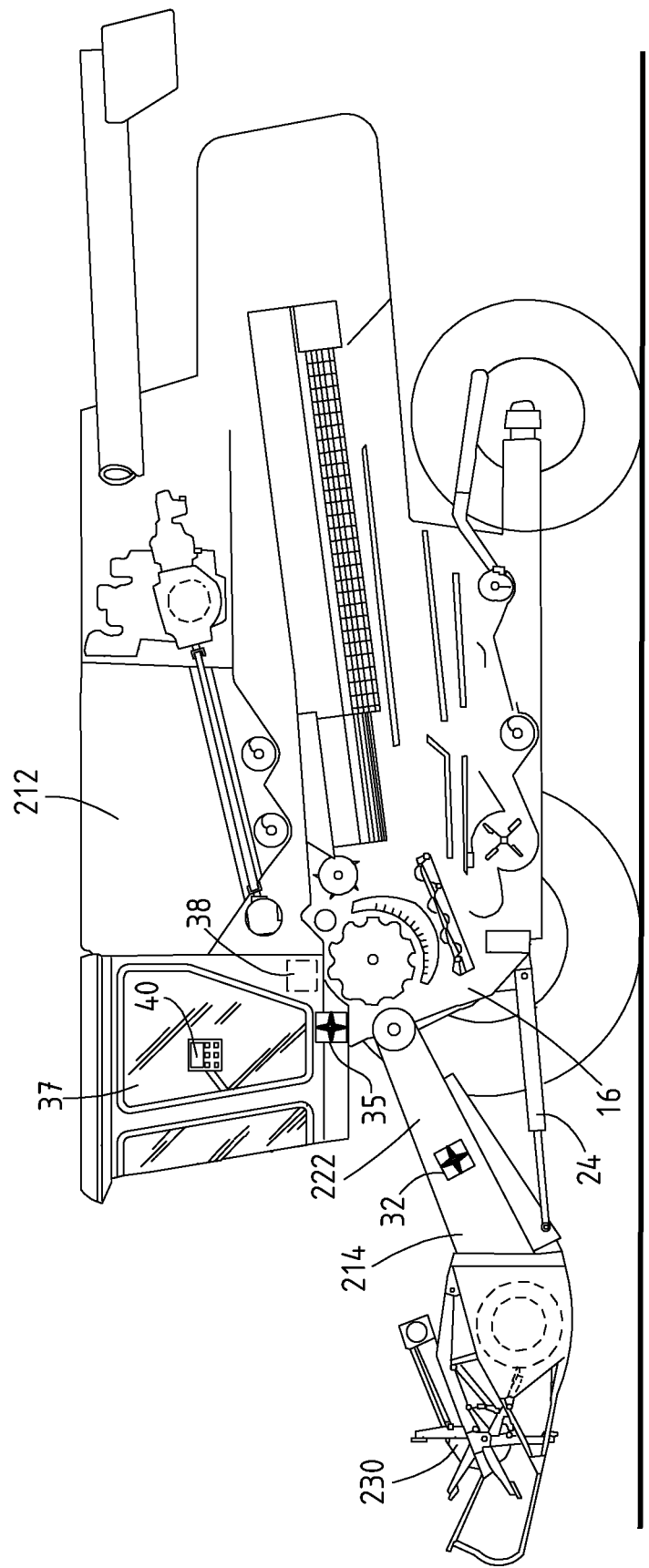
FIG. 4 is a schematic side view of an agricultural harvesting machine with a combine header, and showing sensor locations according to the present invention.

FIG. 4 shows a harvesting machine 212 in combination with a lifting apparatus in the form of an implement linkage 214. The implement linkage 214 is connected to the front of the harvesting machine 212 with a frame 16 of the harvesting machine 212. The implement linkage 214 has pull rods 222 which are pivotably coupled to the frame 16 by means of hydraulic cylinders 24. An implement in the form of a combine header 230 is arranged at the front end of the pull rods 222. The implement linkage 214 is provided with a first acceleration sensor 32 in the region of the pull rods 222. A second acceleration sensor 34 is not provided here since the combine header 230 is not pivotably coupled to the implement linkage 214, and therefore cannot be activated by means of a hydraulic cylinder 28 according to FIG. 3 either. In addition, the harvesting machine 212 is provided with an acceleration sensor which constitutes a reference sensor 35 which is attached in the region of the frame 16 (or at any other desired location on the harvesting machine 212), if appropriate, (as illustrated in FIGS. 1 and 2) a further reference sensor 36 being provided in the region of the frame 16 in the form of a gyrostat or rotational speed sensor (not illustrated in FIGS. 3 to 7). The harvesting machine 212 also comprises an electronic control unit 38 which is arranged in the region of a cab 37 and is connected to an input module 40. The determination of the position of the implement linkage 214 or of the implement 230 is carried out by means of the existing sensor system in accordance with the above description with respect to FIG. 2, with the components with the reference signs 12, 14 and 30 corresponding to the exemplary embodiment in FIG. 4 being replaced by the components with the reference signs 212, 214 and 230. Other components from FIG. 3, for example the tool receptacle 26, the hydraulic cylinder 28, the hydraulic valve 48, the associated hydraulic connecting lines 58 and the associated electronic sensor lines 42 and control lines 45 are omitted because they are not present in the exemplary embodiment in FIG. 4.

Figure 5:
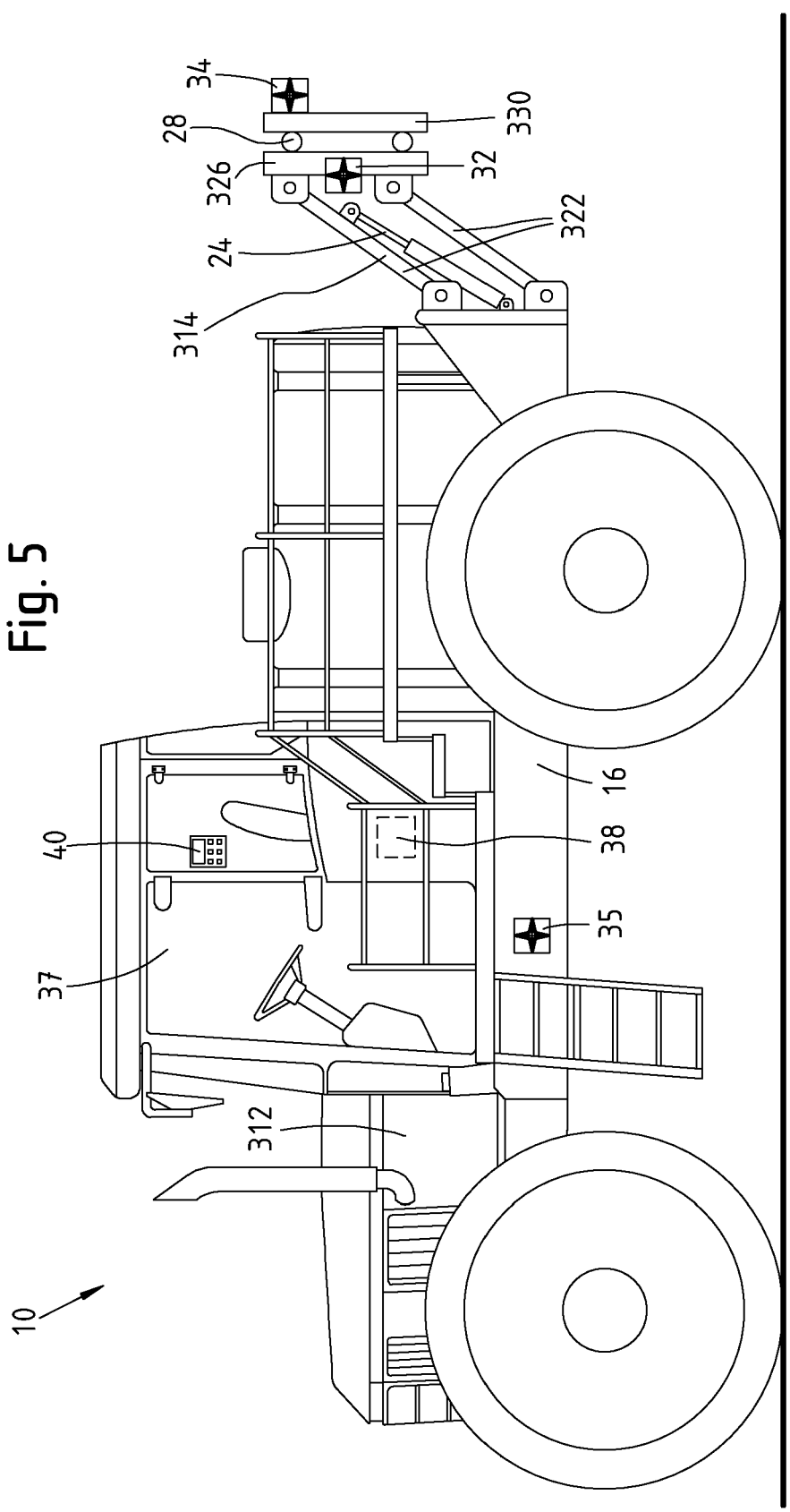
FIG. 5 is a schematic side view of a field sprayer with parallelogram linkage and sprayer linkage, and showing sensor locations according to the present invention.

FIG. 5 shows a self-propelling field sprayer 312 in combination with a lifting apparatus in the form of a parallelogram linkage 314. The parallelogram linkage 314 is connected to the rear of the field sprayer 312 with a frame 16 of the field sprayer 212. The parallelogram linkage 314 has pull rods 322 which are pivotably connected to the frame 16 by means of hydraulic cylinders 24. An implement receptacle 326 is provided at the rear end of the pull rods 322. An implement in the form of a sprayer linkage 330 is arranged on the implement receptacle 326, said sprayer linkage 330 being coupled to the implement receptacle 326 in such a way that it can pivot about a longitudinal axis of the machine 10 by means of a further hydraulic cylinder 28. The parallelogram linkage 314 is provided with a first acceleration sensor 32 in the region of the pull rods 322. A further acceleration sensor 34 is provided in the region of the sprayer linkage 330. In addition, the field sprayer 312 is provided with an acceleration sensor which constitutes a reference sensor 35 which is attached in the region of the frame 16 (or at any other desired location on the field sprayer 312), if appropriate it being possible, as illustrated in FIGS. 1 and 2, for a further reference sensor 36 to be provided in the region of the frame 16 in the form of a gyrostat or rotational speed sensor (not illustrated in FIGS. 3 to 7). The field sprayer 312 also comprises an electronic control unit 38 which is arranged in the region of a cab 37 and is connected to an input module 40. The determination of the position of the parallelogram linkage 314 or of the spray linkage 330 is carried out by means of the existing sensor system in accordance with the above description with respect to FIG. 2, with the components with the reference signs 12, 14, 26 and 30 corresponding to the exemplary embodiment in FIG. 5 being replaced by the components with the reference signs 312, 314, 326 and 330.

Figure 6:
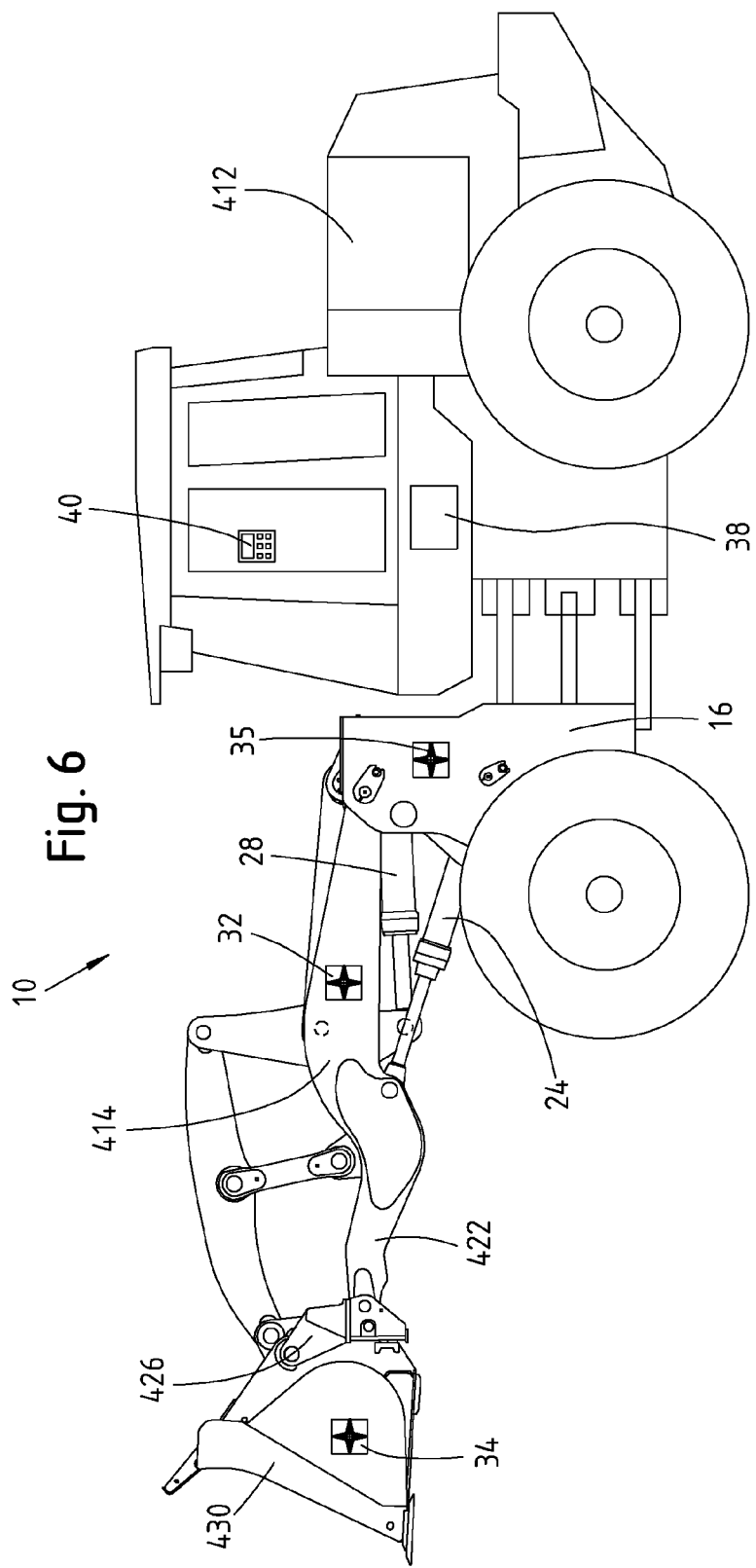
FIG. 6 is a schematic side view of an agricultural wheel loader with shovel, and showing sensor locations according to the present invention.

FIG. 6 shows a wheel loader vehicle 412 in combination with a lifting apparatus in the form of a loading apparatus 414. The loading apparatus 414 is connected to the front of the wheel loader vehicle 412 with a frame 16 of the wheel loader vehicle 412. The loading device 414 has a rocker 422 which is pivotably coupled to the frame 16 by means of hydraulic cylinders 24. An implement receptacle or tool receptacle 426, to which an implement in the form of a loader shovel 430 is coupled, is provided at the front end of the rocker 422, with the tool receptacle 426 being pivotably coupled by means of a further hydraulic cylinder 28. The loading apparatus 414 is provided with a first acceleration sensor 32 in the region of the rocker 422. A further acceleration sensor 34 is provided in the region of the loader shovel 430. In addition, the wheel loader vehicle 412 is provided with an acceleration sensor which constitutes a reference sensor 35 which is attached in the region of the frame 16 (or at any other desired location on the wheel loader vehicle 412), if appropriate it being possible, as illustrated in FIGS. 1 and 2, to provide a further reference sensor 36 in the region of the frame 16 in the form of a gyrostat or rotational speed sensor (not illustrated in FIGS. 3 to 7). The wheel loader vehicle 412 also comprises an electronic control unit 38 which is arranged in the region of a cab 37 and is connected to an input module 40. The determination of the position of the loading apparatus 414 or of the loader shovel 430 is carried out by means of the existing sensor system in accordance with the above description with respect to FIG. 2, with the components with the reference signs 12, 14, 26 and 30 according to the exemplary embodiment in FIG. 6 being replaced by the components with the reference signs 412, 414, 426 and 430.

Figure 7:
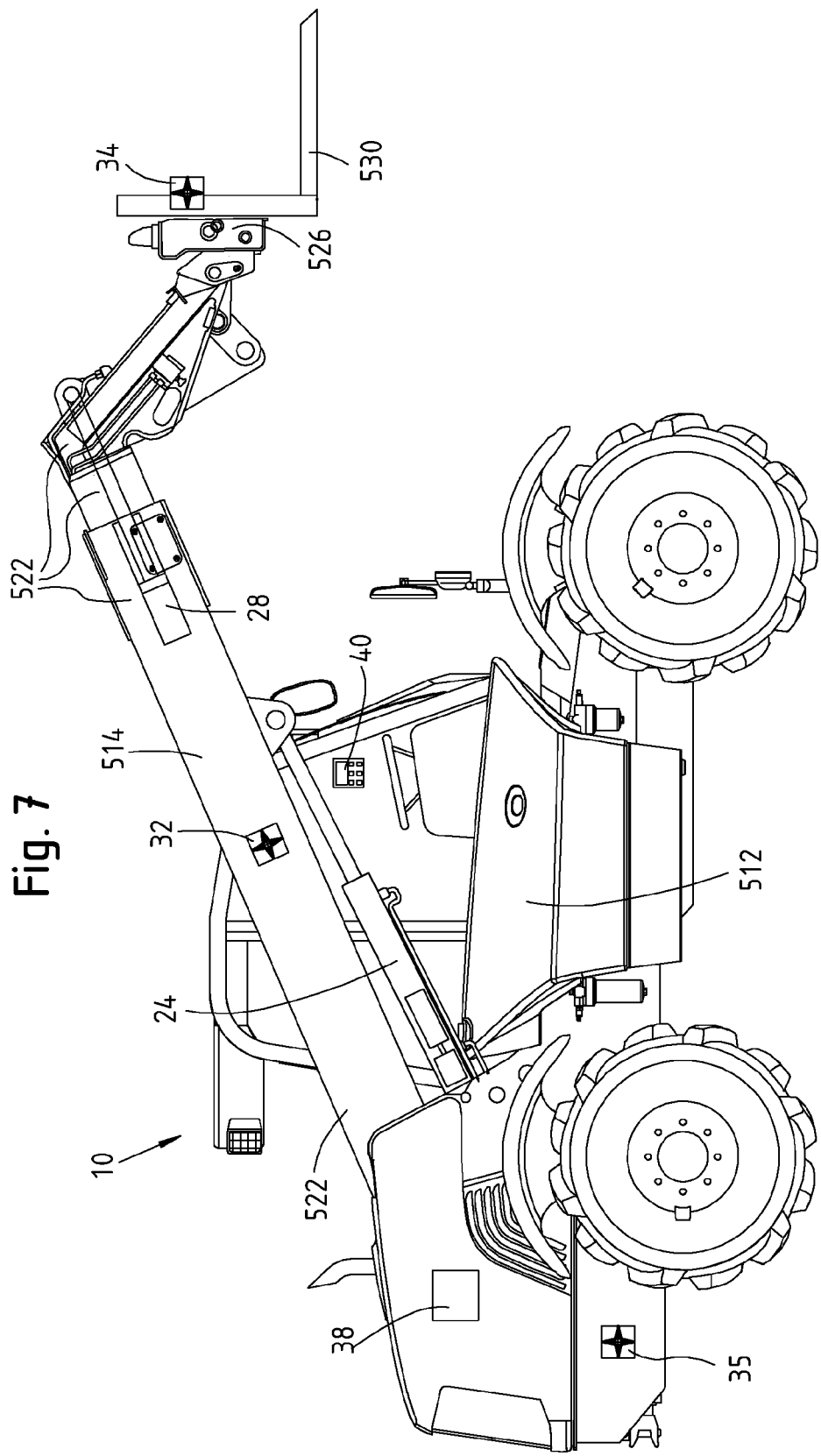
FIG. 7 is a schematic side view of a telescopic loader with a fork, and showing sensor locations according to the present invention.

FIG. 7 shows a telescopic loader vehicle 512 in combination with a lifting apparatus in the form of a telescopic extension arm 514. The telescopic extension arm 514 is connected to a frame 16 of the telescopic loader vehicle 512. The telescopic extension arm 514 comprises a plurality of extension arm elements 522 which are guided telescopically one in the other, and is pivotably coupled to the frame 16 by means of a hydraulic cylinder 24.

At the front end of the telescopic extension arm 514, an implement receptacle or tool receptacle 526, to which an implement in the form of a fork 530 is coupled, is provided, the tool receptacle 526 being pivotably coupled by means of a further hydraulic cylinder 28. The telescopic extension arm 514 is provided with a first acceleration sensor 32 in the region of the extension arm elements 522. A further acceleration sensor 34 is provided in the region of the fork 530. In addition, the telescopic loader vehicle 512 is provided with an acceleration sensor which constitutes a reference sensor 35 which is attached in the region of the frame 16 (or at any other desired location on the telescopic loader vehicle 512), if appropriate, it being possible, as illustrated in FIGS. 1 and 2, to provide a further reference sensor 36 in the region of the frame 16 in the form of a gyrostat or rotational speed sensor (not illustrated in FIGS. 3 to 7). The telescopic loader vehicle 512 also comprises an electronic control unit 38 which is arranged in the region of a cab 37 and is connected to an input module 40. The determination of the position of the telescopic extension arm 514 or of the fork 530 is carried out by means of the existing sensor system in accordance with the above description with respect to FIG. 2, with the components with the reference signs 12, 14, 26 and 30 according to the exemplary embodiment in FIG. 7 being replaced by the components with the reference signs 512, 514, 526 and 530.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In a vehicle having a lifting apparatus coupled to an implement and a control system for controlling the lifting apparatus, the control system comprises:
   an electronic control unit which is connected to sensors for controlling the position of the lifting apparatus and/or of the implement, the sensors comprise acceleration sensors, wherein first acceleration sensor is located on the lifting apparatus and/or on the implement and a second acceleration sensor is located on the vehicle as a reference sensor, and wherein a position signal for the lifting apparatus and/or for the implement is generated by the electronic control unit performing a relative measurement of a signal of the first acceleration sensor and a signal of the reference sensor, the control unit receiving a reference acceleration vector from the reference sensor and a position acceleration vector from the first acceleration sensor and determining the position signal from a difference in direction between the position acceleration vector and the reference acceleration vector.

2. The control system of claim 1, wherein:
   the acceleration sensors comprise micro-electro-mechanical acceleration devices.

3. The control system of claim 1, further comprising:
   a gyroscope sensor mounted on the vehicle, the control unit basing an error correction on a signal from the gyroscope sensor.

4. The control system of claim 1, wherein:
   the lifting apparatus comprises a front loader and the implement comprises a front loader tool.

5. The control system of claim 4, wherein:
   the front loader includes a tool receptacle to which the front loader tool is coupled, and the acceleration sensor is mounted on the tool receptacle.

6. The control system of claim 1, wherein:
   the lifting apparatus comprises a three-point trailer apparatus, and the implement comprises a trailer unit which is coupled to the trailer apparatus.

7. The control system of claim 1, wherein:
   the lifting apparatus comprises an implement linkage for a combine header, and the implement comprises a combine header.

8. The control system of claim 1, wherein:
   the vehicle comprises an agricultural tractor.

9. The control system of claim 1, wherein:
   the vehicle comprises a self-propelling harvesting machine.

10. The control system of claim 1, wherein:
    the vehicle comprises an agricultural field sprayer, the lifting apparatus comprises a parallelogram linkage, and the implement comprises a sprayer linkage.

11. The control system of claim 1, wherein:
    the vehicle comprises a wheel loader vehicle, wherein the lifting apparatus comprises a loading apparatus, and the implement comprises a shovel.

12. The control system of claim 1, wherein:
    the vehicle comprises a telescopic loader vehicle, and the lifting apparatus comprises a telescopic extension arm to which an implement is coupled via a tool receptacle.

13. The control system of claim 1, further comprising:
    a rotational speed sensor mounted on the vehicle, the control unit basing an error correction on a signal from the rotational speed sensor.

* * * * *